US009432625B2

(12) United States Patent
Delegue et al.

(10) Patent No.: US 9,432,625 B2
(45) Date of Patent: Aug. 30, 2016

(54) IMMERSIVE VIDEOCONFERENCE METHOD AND SYSTEM

(71) Applicant: Alcatel Lucent, Boulogne Billancourt (FR)

(72) Inventors: Gerard Delegue, Nozay (FR); Nicolas Bouche, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/431,101

(22) PCT Filed: Sep. 3, 2013

(86) PCT No.: PCT/EP2013/068169
§ 371 (c)(1),
(2) Date: Mar. 25, 2015

(87) PCT Pub. No.: WO2014/048686
PCT Pub. Date: Apr. 3, 2014

(65) Prior Publication Data
US 2015/0244987 A1 Aug. 27, 2015

(30) Foreign Application Priority Data

Sep. 28, 2012 (EP) ..................................... 12186744

(51) Int. Cl.
*H04N 7/15* (2006.01)
*H04M 3/56* (2006.01)
*H04N 13/02* (2006.01)

(52) U.S. Cl.
CPC ............. *H04N 7/157* (2013.01); *H04M 3/567* (2013.01); *H04N 13/0239* (2013.01); *H04N 2213/003* (2013.01)

(58) Field of Classification Search
CPC .......... H04N 7/14; H04N 7/141; H04N 7/15; H04N 7/152; H04N 7/157
USPC ...................... 348/14.01–14.16; 715/756–757
See application file for complete search history.

(56) References Cited

U.S. PATENT DOCUMENTS 6,285,392 B1    9/2001 Satoda et al.
6,583,808 B2    6/2003 Boulanger et al.
(Continued)

FOREIGN PATENT DOCUMENTS

JP     2000-165831     6/2000
KR     10-2011-0050595  5/2011

OTHER PUBLICATIONS

International Search Report for PCT/EP2013/068169 dated Oct. 10, 2013.
(Continued)

Primary Examiner — Stella L Woo
(74) Attorney, Agent, or Firm — Fay Sharpe LLP

(57) ABSTRACT

An immersive videoconference method wherein multiple participants (21, 22, 23, 24) in different locations (11, 12, 13) remotely interact with each other through a telecommunication network architecture (8, 31, 38), wherein the method comprises at the location (11, 12, 13) of a given participant (21, 22, 23, 24); —capturing video images of the participant by a pair of video cameras (4A, 4B); —detecting, tracking and determining size and position related parameters of the participant in the video images; —generating a single elementary video stream related to the participant; —associating a room identifier to the elementary video stream, the room identifier being uniquely associated to the given participant; —sending the elementary video stream, the size and position related parameters and the room identifier (41A, 42A, 43A) to a centralized entity (30); —repeating the above steps for each participant (21, 22, 23, 24) at the different location (11, 12, 13); wherein the method further comprises at the centralized entity (30): —creating a virtual room (70) by combining the elementary video streams (41A, 42A, 43A) for all the participants; —staging the elementary video streams of all the participants in said virtual room and computing a scene specification associated to the room identifier of each participant based on the size and position related parameters of all the participants; and —generating, for each participant, a single composite video stream (41B, 42B, 43B) of the virtual room (70) that displays the 2D video of the other participants sized and positioned as if the participants (21, 22, 23, 24) were in the same virtual room (70) based on the scene specification and a combination of the elementary video streams of the other participants.

10 Claims, 3 Drawing Sheets

(56) References Cited

U.S. PATENT DOCUMENTS

| | | |
|---|---|---|
| 8,432,431 B2 | 4/2013 | Gorzynski et al. |
| 8,542,265 B1 * | 9/2013 | Dodd et al. ................. 348/14.08 |
| 2012/0155773 A1 * | 6/2012 | Tsukamoto et al. .......... 382/190 |
| 2012/0281059 A1 * | 11/2012 | Chou et al. ................. 348/14.07 |
| 2013/0300939 A1 * | 11/2013 | Chou et al. ................... 348/700 |

OTHER PUBLICATIONS

Ikemura, Sho, et al., "Real-Time Human Detection using Relational Depth Similarity Features", Computer Vision-ACCV 2010, Springer Berlin, Heidelberg, pp. 25-38.

* cited by examiner

IMMERSIVE VIDEOCONFERENCE METHOD AND SYSTEM

An aspect of the invention relates to an immersive videoconference method. The invention further relates to an immersive videoconference system. The terminology videoconference is considered to comprise teleconference, web conference, multimedia conference and the like.

Such a method and system find a particular, though non exclusive, application in remote videoconferencing, namely a videoconference where multiple participants remotely interact (e.g. deliver multimedia information in a broad meaning) with each other in a live and online manner. The various users are in different locations, though some of them may be grouped in one location.

Immersive videoconferencing system aims at creating the sense of being in the same virtual room for local and remote participants. In typical immersive videoconferencing system, participants are assumed to be static, e.g. sitting on a chair. Further, the video staging is mostly static and therefore not calculated for each participant according to his position in a virtual room. There is a need to provide an immersive videoconferencing system that is able to build a virtual room and show to each participant a field of vision that simulates what this participant sees when he moves relatively to others participants in the virtual room.

The document U.S. Pat. No. 6,583,808 describes a system and method for stereoscopic video teleconferencing that provides an immersive virtual meeting experience. Each participant is surrounded by at least two video cameras. The system senses the position of each of the participants and uses this information to select, for each participant, camera pairs to capture a stereo pair of video images of each of the other participants. The system is adapted to isolate the image of each participant from the background. The system transforms the stereo pair images to adjust the perspective for the interocular spacing of each participant. The processed stereo pairs of video images are transmitted to the respective participants. For each participant, the system assembles a stereo video display image of a virtual meeting room, combining the stereo pair images of each of the other participants appropriately sized and positioned. Three-dimensional (3D) virtual objects can also be displayed and manipulated by participants.

However, this is not satisfactory because this system and method require complex operations to compute stereoscopic views of the participants. As a consequence, in order to implement this system and method, an important power from the processor is needed. Further, 3D renderings are not always appreciated by viewers (need to wear specific glasses, headaches . . . ). Also, processed stereo pairs of video images are transmitted to the respective participants requires important communication bandwidth to be transmitted.

It is an object of the invention to propose a videoconference method and/or device that overcome the above mentioned drawbacks, and in particular reduces the load on the processing entity and/or reduces the consumption of communication bandwidth.

According to one aspect, there is provided an immersive videoconference method wherein multiple participants in different locations remotely interact with each other through a telecommunication network architecture, wherein the method comprises at the location of a given participant:

capturing video images of the participant by a pair of video cameras;

detecting, tracking and determining size and position related parameters of the participant in the video images;

generating a single elementary video stream related to the participant;

associating a room identifier to the elementary video stream, the room identifier being uniquely associated to the given participant;

sending the elementary video stream, the size and position related parameters and the room identifier to a centralized entity;

repeating the above steps for each participant at the different location;

wherein the method further comprises at the centralized entity:

creating a virtual room by combining the elementary video streams for all the participants;

staging the elementary video streams of all the participants in said virtual room and computing a scene specification associated to the room identifier of each participant based on the size and position related parameters of all the participants; and generating, for each participant, a single composite video stream of the virtual room that displays the 2D video of the other participants sized and positioned as if the participants were in the same virtual room based on the scene specification and a combination of the elementary video streams of the other participants.

The step of detecting and tracking the participant in the video images may comprise detecting and tracking a body of the participant without a background from the video images based on a histograms of oriented gradients HOG for the purpose of human detection algorithm.

The results of said HOG algorithm may be further filtered by a depth mapping matrix computed from a pair of video signals of the participant obtained from the pair of video cameras.

The depth mapping matrix may be computed based on a pinhole camera model.

The step of detecting and tracking the participant in the video images may comprise determining a 3D position of the participant relatively to a position of one of the video camera based on a binary mask image and the depth mapping matrix.

The step of generating the elementary video stream may comprise encoding images of the elementary video stream with a textured mask, the elementary video stream being a Red Green Blue and Alpha RGBA video stream with alpha being the level of transparency.

The scene specification may comprise z-indexes of the elementary video streams describing whether an elementary video stream related to one participant is in front or behind other elementary video streams related to the other participants in the virtual room, a 2D position of each video describing the positions of each participant relatively to a given point of view in the virtual room, and a zoom scale describing the proximity of one participant relatively to another one.

The step of generating one composite video stream for the participant may comprise translating, zooming and superimposing the elementary video streams received from the other participants based on the scene specification.

The method may further comprise only publishing and displaying said single composite video stream to an appropriate participant based on the corresponding unique room identifier.

According to another aspect, there is provided an immersive videoconference system wherein multiple participants in different locations remotely interact with each other through a telecommunication network architecture, the immersive videoconference system comprising:

a pair of video cameras, at the location of each participant, arranged to capture video signals of the participant;

a pre-treatment module, at the location of each participant, comprising a depth map generator coupled to a tracker arranged to detect and track the participant in the video images, a body position calculator arranged to determine size and position related parameters of the participant in the video images, a video streamer arranged to generate a single elementary video stream related to the participant, and a room identifier requestor arranged to associate a room identifier to the elementary video stream; and a virtual place building module, at a centralized location, comprising a staging director arranged to create a virtual room by combining the elementary video streams for all the participants, stage the elementary video streams of all the participants in said virtual room and compute a scene specification associated to the room identifier of each participant based on the size and position related parameters of all the participants, and a video mixer arranged to generate, for each participant, a single composite video stream of the virtual room that displays the 2D video of the other participants sized and positioned as if the participants were in the same virtual room based on the scene specification and a combination of the elementary video streams of the other participants.

The virtual place building module may further comprises a video server arranged to publish the composite video streams of the participants, each video stream being associate with a room identifier uniquely associated to the given participant.

According to a further aspect, there is provided a computer program for an immersive videoconference system, the immersive videoconference system comprising at least a participant processing unit, at least one remote participant processing unit that are coupled to each other in a telecommunication network architecture through a control and processing entity, the computer program product comprising a set of instructions that, when loaded into a program memory of and run by the participant processing unit and the control and processing entity of the immersive videoconference system, causes the system to carry out the steps of the immersive videoconference method according to the invention.

According to still another aspect, there is provided a centralized videoconference server comprising the virtual place building module of the immersive videoconference system server according to the invention.

The invention enables building for each participant a virtual room that displays the video of the other participants as if the participants were in the same room. The method and system of the invention enables extracting the background of each video, localizing the 3D position of the participant in the video, and staging a scene by merely determining the size, the position and the visible parts for each remote participant for a given participant. This invention enables to improve immersive videoconferencing system and method by managing the movement of participant in a room. The immersion impression is provided to the participant without having to equip a room with complex equipments and by having a low bandwidth consumption and using low power of the processing unit. With this immersive videoconferencing system and method, the interactions with remote participants are more natural. A participant just needs to be closer to another participant to see him better and/or to be more visible.

Other advantages will become apparent from the hereinafter description of the invention.

The present invention is illustrated by way of examples and not limited to the accompanying drawings, in which like references indicate similar elements:

Figure 2:
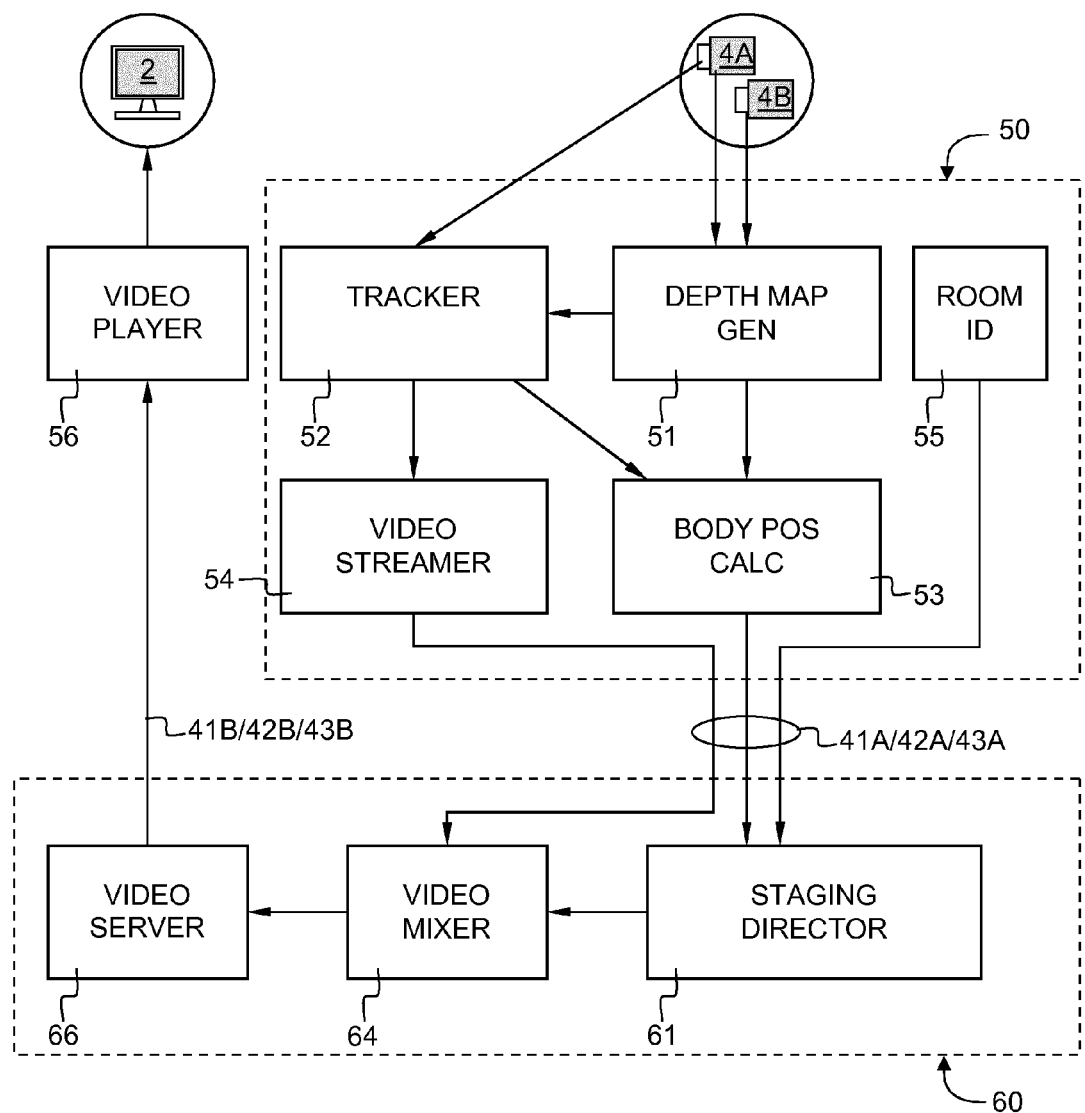
FIG. 2 is a block diagram schematically illustrating an embodiment of the modules of the immersive videoconferencing system and method with dynamic staging used in the system of FIG. 1.
Figure 3:
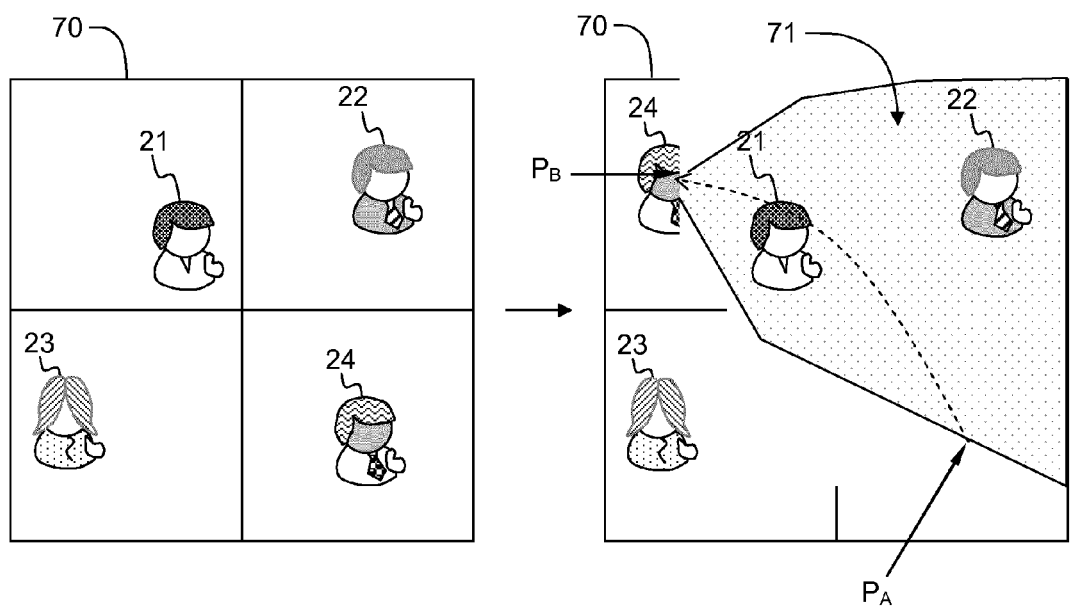
Figure 4:
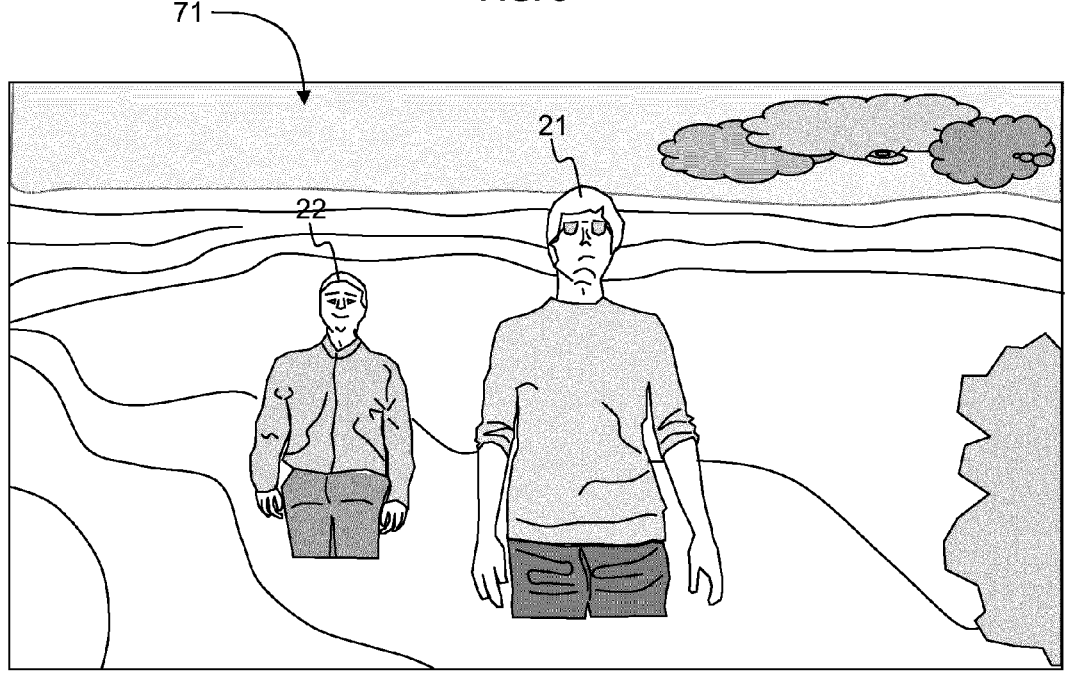

FIG. 3 is a block diagram schematically illustrating an example of positions of the remote participants relatively to each other in a virtual room and their modifications in time; and FIG. 4 is an example of a screen showing an image of a video displayed to a particular participant in the frame of the example depicted in FIG. 3, said video being generated by the embodiment of the immersive videoconference system with dynamic staging of FIG. 2 when the participant is in position $P_B$.

Figure 1:
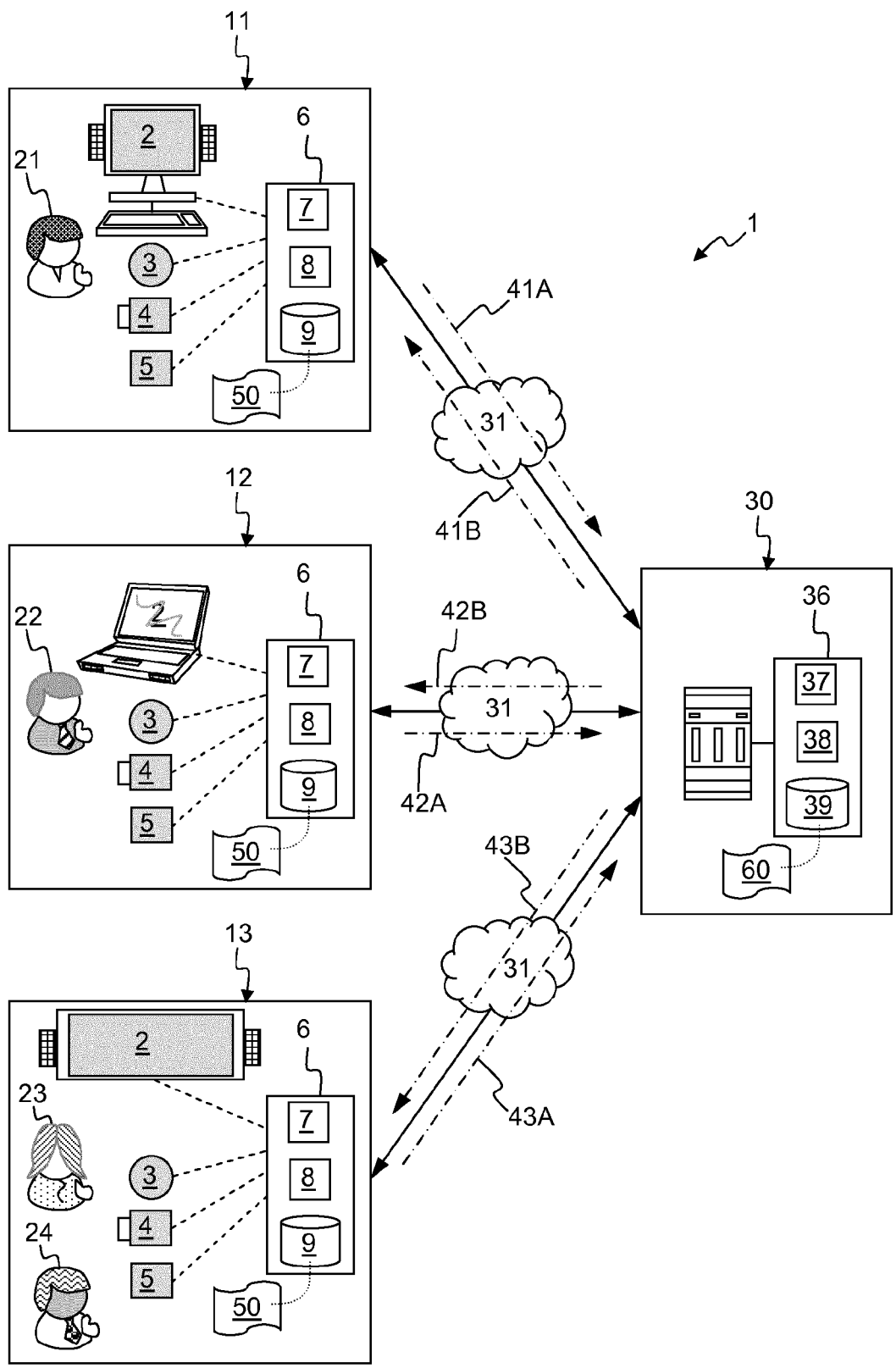
FIG. 1 is a block diagram schematically and partially illustrating an immersive videoconferencing system between individuals, namely numerous remote participants that are located in different locations.

FIG. 1 is a block diagram schematically illustrating an immersive videoconferencing system 1 between individuals in different locations.

A first individual, namely a participant 21 of the video conference is located in a first place 11. A second individual, namely another participant 22 is located in a second place 12. It is to be understood that there may be multiple participants in the same location. For example, third and fourth individuals respectively participants 23 and 24 are located in a third place 13. All of these individuals initiate a remote videoconference, wherein each participant 21, 22, 23, 24 may interacts with the other participants 21, 22, 23, 24. For example the participant 21 may, at a given time, deliver various information to the remote participants 22, 23 and 24.

Each of the places 11, 12, 13 in which the participants 21, 22, 23, 24 are located has a sound restitution means and/or visual restitution means 2, several sensors 3, 4, 5, and a local processing unit 6. The sensors comprise for example a microphone 3, a pair of video cameras 4 per participant, and optionally additional sensors 5. The video cameras can be motorized video cameras. There may also be several pairs of video cameras in one place, especially when several participants may be present in one place. The additional sensor 5 may be any type of sensor for measuring one or more parameters related to the location and or participants in this location (e.g. a temperature sensor, humidity sensor, ambient light sensor and/or motion detection sensor, etc. . . . ). The sound and/or visual restitution means 2 can be a display associated with speakers, such as a computer screen, or a laptop, or a video projector. The processing unit 6 may be a local computer or a specific videoconference device comprising a processor 7, a modem 8 and a memory 9. The modem 8 enables a wired or wireless connection to a communications network 31. The communication network 31 may be a global network of communication such as Internet or a private communications network such as an intranet. A first module, namely a pre-treatment module 50 as described in details hereinafter with respect to FIG. 2 is run by the processing unit 6. For example, the pre-treatment module 50 may be implemented as a computer program product that can be loaded into the memory 9 of the processing unit 6 at each place 11, 12, 13. In this case, the computer program product implements a portion of the method of videoconferencing of the invention when the program is executed by the processor 7.

The immersive videoconferencing system 1 further comprises a control and processing entity 30. The control and processing entity 30 can be implemented as a specific remote centralized videoconferencing server 36 comprising a processor 37, a modem 38 and a memory 39. The remote centralized videoconferencing server 36 is connected through the modem 38 and the communication network 31 to the various local processing units 6 of the participants to the videoconference. A second module, namely a virtual place building module 60 for a particular participant as described hereinafter with respect to FIG. 2 that may be implemented as a computer program product can be loaded into the memory 39 of the server 36 of the control and processing entity 30. In this case, the computer program product implements another portion of the method of videoconferencing of the invention when the program is executed by the processor 37.

Thus, the various local processing units 6 and the remote centralized videoconferencing server 36 implement the method of videoconferencing of the invention.

Each local processing unit 6 serves to generate a data stream with video and/or audio signals and/or other parameters measured by the additional sensors from the output signals of the sensors 3, 4, 5. First, second and third input data stream 41A, 42A, 43A is related to the respective participant 21, 22, 23, 24 located in the first, second and third place 11, 12, 13, respectively. All these input data streams that are pretreated locally as explained in details hereinafter are then transmitted to the remote centralized videoconferencing server 36. The remote centralized videoconferencing server 36 further handles these input data streams 41A, 42A, 43A and generates first, second and third output data streams 41B, 42B, 43B as explained in details hereinafter. The output data streams from the remote centralized videoconferencing server 36 are presented to their respective participants by way of the sound and/or visual restitution means 2, namely the video is restituted by the display and the audio signal is restituted by the speakers.

The local processing unit 6 and control and processing entity 30 execute various functions for providing the immersive videos to the participants. These functions or at least a part of these functions may be implemented as modules of the computer program product that can be executed by the processors 7, 37 of the local processing unit 6 and the server 36, respectively. Some of these functions may be implemented by stand-alone entity(ies).

FIG. 2 is a block diagram schematically illustrating an exemplary embodiment of the modules of the immersive videoconferencing system and method with dynamic staging that can be implemented in the videoconferencing system of FIG. 1. The immersive videoconferencing system comprises the pre-treatment module 50 and the virtual place building module 60.

The pre-treatment module 50 is an entity in charge of capturing the video of the participant with background at his location, deleting the background, determining the 3D position of the participant, and generating an elementary video stream for the participant.

The pre-treatment module 50 comprises a depth map generator 51, a tracker 52, a body position calculator 53, a video streamer 54 and a room identifier requestor 55.

The depth map generator 51 receives as input the video signals of the pair of calibrated stereo video cameras 4A and 4B. The depth map generator 51 computes as output a depth mapping matrix based on said video signals. The depth mapping matrix may be computed based on a known pinhole camera model (the pinhole camera model is a first order approximation of the mapping from a 3D scene to a 2D image). The intrinsic parameters of each video camera (e.g. focal lengths, principal or nodal points) and the extrinsic parameters of each video camera (e.g. rotation-translation matrix) may also be estimated and transmitted to the tracker 52.

The tracker 52 receives as input the video signal of one of the two calibrated stereo video cameras 4A and 4B, and the depth mapping matrix computed by the depth map generator 51. The tracker 52 is used to detect and to track the participant present in the video. The tracking may be made based on a known algorithm using histograms of oriented gradients HOG for the purpose of human detection. The depth mapping matrix is further used to filter the results, improve the recognition rate and delimit the body of the participant. This tracker 52 generates a first type of images with a binary mask, and a second type of images with a textured mask. These images are used to localize the participant on the video.

The body position calculator 53 receives as input the images with the binary mask generated by the tracker 52 and the depth mapping matrix computed by the depth map generator 51. The body position calculator determines the 3D position of the participant relatively to the video camera 4A, 4B. The 3D position of the participant (more precisely of the barycenter of the participant) is computed.

The video streamer 54 is in charge of encoding the images coming from the tracker 52 and to publish a corresponding video stream into the video mixer 64 of the virtual place building module 60. Videos are encoded with alpha transparency with the background removed. The video streamer 54 encodes the images with a textured mask generated by the tracker 52 into a video stream.

The room identifier requestor 55 generates a unique room identifier associated to the room where the participant is located. Thus, each video stream can be published with said unique room identifier. This unique room identifier will be used to associate the video stream of a participant with its 3D position by the virtual place building module 60.

An input data streams 41A, 42A, 43A comprising the video stream, the 3D position of the participant, and the unique room identifier is generated and transmitted to the virtual place building module 60 that is run by the centralized remote video conferencing server 36. Thus, for each room with a participant, an input data stream mainly comprising a single video stream is sent continuously (one single video streaming) to the virtual place building module 60. This is particularly efficient in term of bandwidth consumption.

The virtual place building module 60 is an entity in charge of creating virtual rooms for each participant, each virtual room being generated by combining the elementary video streams of each participant according to their position within said room.

The virtual place building module 60 comprises a staging director 61, a video mixer 64 and a video server 66.

The staging director 61 receives as input the input data streams 41A, 42A, 43A from all the participants to the videoconference. The staging director 61 is in charge of performing the staging of video streams for each participant. The staging director 61 computes a scene specification for each unique room identifier based on the 3D positions of each remote participant. For each unique room identifier, the scene specification includes a list comprising z-indexes of the video, a 2D position of each video and a zoom scale. The z-indexes are parameters describing whether a video related to one participant is in front or behind other videos related to the other participants. The 2D position of each video is a parameter used to translate the positions of each participant relatively to a given point of view. The zoom scale is a parameter used to simulate the proximity of a participant relatively to another one.

As depicted in FIG. 3 (left part), the virtual positions of the participants (in the example depicted in FIG. 3—participants 21, 22 and 23) in a virtual room 70 are computed from the real position in the room of the participant being the observer (in the example depicted in FIG. 3—participant 24). As depicted in FIG. 3 (right part), when the participant being the observer (in the example depicted in FIG. 3—participant 24) moves from a first position $P_A$ to a second position $P_B$, only the participants in the field of vision 71 are visible (in the example depicted in FIG. 3, it is the case of participants 21 and 22), all the other participants behind him are masked (in the example depicted in FIG. 3, it is the case of participant 23).

FIG. 4 schematically illustrates a screen simulating the field of vision 71 shown to the participant being the observer 24 in the second position $P_B$ according to the example presented and depicted in FIG. 3. It shows what the participant being the observer 24 can see, namely only the participants 21 and 22 in the example of FIG. 3. The participant 21 has a larger size than the participant 22 because the participant being the observer 24 is virtually closest to the participant 21 than to the participant 22.

The video mixer 64 is in charge of generating the immersive videos using the input data streams 41A, 42A, 43A from all the participants to the videoconference, and based on the scene specifications received from the staging director 61. The immersive video for a given participant is a composite video showing the other participants in the virtual room and in the field of vision of said given participant. The video mixer 64 superimposes a set of video streams RGBA, namely Red Green Blue and Alpha with an alpha being the level of transparency. It receives a set of video streams RGBA from the different location and recalculates a composite video, for each participant being the observer, the position and size of the other participant in the field of vision of said participant being the observer. The hereinbefore mentioned operations (i.e. translation of images (x, y), zoom, image fusion using the level of alpha transparency) are basic operations that require only a low power from the processor.

The immersive video of all the participants are stored on the video server 66. Thus, for a given participant, receiving the corresponding immersive video only requires receiving a single video stream. This is further particularly efficient in term of bandwidth consumption.

The video player 56 is in charge of preparing the immersive video to be displayed to the participant identified according to his unique room identifier. The immersive video is displayed on the visual restitution means 2 of said participant.

The invention enables providing immersive video to each participant in real-time. The use of the term "real-time" should also encompass the notion of "near real-time": real time meaning that, for example, an immersive video is to be generated in less than 1 second from the time at which the video cameras provide the video signal to the pre-treatment module 50, while near real-time meaning that, for example, an immersive video is to be generated in less than 1 minute.

The drawings and their description hereinbefore illustrate rather than limit the invention.

Although a drawing shows different functional entities as different blocks, this by no means excludes implementations in which a single entity carries out several functions, or in which several entities carry out a single function. In this respect, the drawings are very diagrammatic. The functions of the various elements shown in the FIGS., including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "entity" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that, though the description describes the virtual place building module 60 implemented by the control and processing entity 30 as a specific remote videoconferencing server 36, this is an example of a centralized embodiment. Indeed, the virtual place building module 60 may also be implemented by a specific website to which the participants may be connected, or by the local processing unit 6 at one of the participant location 11, 12, 13. The various entities of the virtual place building module 60 may also be implemented in a decentralized/distributed way, the various entities being spread among the local processing unit 6. Further, a cloud computing based implementation may be used to derive an immersive video for each participant based on video and data obtained from the various participants.

It should be appreciated by those skilled in the art that any block diagrams herein represent conceptual views of illustrative circuitry embodying the principles of the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. An immersive videoconference method allowing multiple participants in different locations to remotely interact with each other through a telecommunication network architecture, wherein the method comprises at the location of a given participant:
    capturing video images of the participant by a pair of video cameras;
    detecting, tracking and determining size and position related parameters of the participant in the video images;
    generating a single elementary video stream related to the participant;
    associating a room identifier to the elementary video stream, the room identifier being uniquely associated to the given participant;

sending the elementary video stream, the size and position related parameters and the room identifier to a centralized entity;
repeating the above for each participant at each different location;
wherein the method further comprises at the centralized entity:
creating a virtual room by combining the elementary video streams for all the participants;
staging the elementary video streams of all the participants in said virtual room and computing a scene specification associated to the room identifier of each participant based on the size and position related parameters of all the participants; and
generating, for each participant, a single composite video stream of the virtual room that displays the 2D video of the other participants sized and positioned as if the participants were in the same virtual room based on the scene specification and a combination of the elementary video streams of the other participants;
wherein detecting and tracking the participant in the video images comprises detecting and tracking a body of the participant without a background from the video images based on a histograms of oriented gradients HOG for the purpose of human detection algorithm and wherein results of said HOG algorithm are further filtered by a depth mapping matrix computed from a pair of video signals of the participant obtained from the pair of video cameras.

2. The immersive videoconference method of claim 1, wherein the depth mapping matrix is computed based on a pinhole camera model.

3. The immersive videoconference method according to claim 1, wherein detecting and tracking the participant in the video images comprises determining a 3D position of the participant relatively to a position of one of the video camera based on a binary mask image and the depth mapping matrix.

4. The immersive videoconference method according to claim 1, wherein generating the elementary video stream comprises encoding images of the elementary video stream with a textured mask, the elementary video stream being a Red Green Blue and Alpha video stream with alpha being the level of transparency.

5. The immersive videoconference method according to claim 1, wherein generating one composite video stream for the participant comprises translating, zooming and superimposing the elementary video streams received from the other participants based on the scene specification.

6. The immersive videoconference method according to claim 1, wherein the method further comprises only publishing and displaying said single composite video stream to an appropriate participant based on the corresponding unique room identifier.

7. An immersive videoconference method allowing multiple participants in different locations to remotely interact with each other through a telecommunication network architecture, wherein the method comprises at the location of a given participant:
capturing video images of the participant by a pair of video cameras;
detecting, tracking and determining size and position related parameters of the participant in the video images;
generating a single elementary video stream related to the participant;
associating a room identifier to the elementary video stream, the room identifier being uniquely associated to the given participant;
sending the elementary video stream, the size and position related parameters and the room identifier to a centralized entity;
repeating the above for each participant at each different location;
wherein the method further comprises at the centralized entity:
creating a virtual room by combining the elementary video streams for all the participants;
staging the elementary video streams of all the participants in said virtual room and computing a scene specification associated to the room identifier of each participant based on the size and position related parameters of all the participants; and
generating, for each participant, a single composite video stream of the virtual room that displays the 2D video of the other participants sized and positioned as if the participants were in the same virtual room based on the scene specification and a combination of the elementary video streams of the other participants;
wherein the scene specification comprises z-indexes of the elementary video streams describing whether an elementary video stream related to one participant is in front or behind other elementary video streams related to the other participants in the virtual room, a 2D position of each video describing the positions of each participant relatively to a given point of view in the virtual room, and a zoom scale describing the proximity of one participant relatively to another one.

8. An immersive videoconference system wherein multiple participants in different locations remotely interact with each other through a telecommunication network architecture, the immersive videoconference system comprising:
a pair of video cameras, at the location of each participant, arranged to capture video images of the participant;
a pretreatment module, at the location of each participant, comprising a depth map generator coupled to a tracker arranged to detect and track the participant in the video images, a body position calculator arranged to determine size and position related parameters of the participant in the video images, a video streamer arranged to generate a single elementary video stream related to the participant, and a room identifier requestor arranged to associate a room identifier to the elementary video stream; and
a virtual place building module, at a centralized location, comprising a staging director arranged to create a virtual room by combining the elementary video streams for all the participants, stage the elementary video streams of all the participants in said virtual room and compute a scene specification associated to the room identifier of each participant based on the size and position related parameters of all the participants, and a video mixer arranged to generate, for each participant, a single composite video stream of the virtual room that displays the 2D video of the other participants sized and positioned as if the participants were in the same virtual room based on the scene specification and a combination of the elementary video streams of the other participants;
wherein the tracker is arranged to detect and track a body of the participant without a background from the video images based on a histograms of oriented gradients HOG for the purpose of human detection algorithm and wherein results of said HOG algorithm are further filtered by a depth mapping matrix computed from a pair of video signals of the participant obtained from the pair of video cameras.

9. The immersive videoconference system of claim 8, wherein the virtual place building module further comprises a video server arranged to publish the composite video streams of the participants, each video stream being associate with a room identifier uniquely associated to the given participant.

10. An immersive videoconference system wherein multiple participants in different locations remotely interact with each other through a telecommunication network architecture, the immersive videoconference system comprising:
   a pair of video cameras, at the location of each participant, arranged to capture video images of the participant;
   a pretreatment module, at the location of each participant, comprising a depth map generator coupled to a tracker arranged to detect and track the participant in the video images, a body position calculator arranged to determine size and position related parameters of the participant in the video images, a video streamer arranged to generate a single elementary video stream related to the participant, and a room identifier requestor arranged to associate a room identifier to the elementary video stream; and
   a virtual place building module, at a centralized location, comprising a staging director arranged to create a virtual room by combining the elementary video streams for all the participants, stage the elementary video streams of all the participants in said virtual room and compute a scene specification associated to the room identifier of each participant based on the size and position related parameters of all the participants, and a video mixer arranged to generate, for each participant, a single composite video stream of the virtual room that displays the 2D video of the other participants sized and positioned as if the participants were in the same virtual room based on the scene specification and a combination of the elementary video streams of the other participants;
   wherein the scene specification comprises z-indexes of the elementary video streams describing whether an elementary video stream related to one participant is in front or behind other elementary video streams related to the other participants in the virtual room, a 2D position of each video describing the positions of each participant relatively to a given point of view in the virtual room, and a zoom scale describing the proximity of one participant relatively to another one.

\* \* \* \* \*